United States Patent [19]

Falcomato

[11] 4,431,469
[45] Feb. 14, 1984

[54] ELECTRICAL CONNECTION INSULATOR AND METHOD OF COVERING AN ELECTRICAL CONNECTION THEREWITH

[75] Inventor: Rocco Falcomato, Brooklyn, N.Y.

[73] Assignee: Niemand Bros., Elmhurst, N.Y.

[21] Appl. No.: 425,613

[22] Filed: Sep. 28, 1982

[51] Int. Cl.³ .................. H01R 4/70; B32B 1/08; B29C 27/20
[52] U.S. Cl. ...................... 156/86; 29/859; 138/113; 138/114; 138/148; 174/84 R; 174/138 F; 174/DIG. 8; 428/36
[58] Field of Search ............... 174/5 R, 74 A, 84 R, 174/135, 138 F, 167, DIG. 8; 29/859, 869; 138/112, 113, 114, 148; 156/86; 339/116 R, 116 C, 213 R, 213 T, DIG. 1; 428/36

[56] References Cited

U.S. PATENT DOCUMENTS

Re. 30,447 12/1980 Loyd et al. ............... 174/DIG. 8 X
Re. 30,817 12/1981 Loyd et al. ............... 156/86

FOREIGN PATENT DOCUMENTS 1414461 11/1975 United Kingdom ......... 174/DIG. 8

Primary Examiner—Laramie E. Askin
Attorney, Agent, or Firm—Kane, Dalsimer, Kane, Sullivan & Kurucz

[57] ABSTRACT

An electrical connection insulator comprising an outer tube formed from a mono-layered film of a non-adhesive, heat stable, dielectric, synthetic, polymeric resin enclosing an inner tube formed from a mono-layered film of a non-adhesive, heat shrinkable, dielectric, synthetic, polymeric resin. The outer surface of the inner tube is attached to a selected minor portion of the inner surface of the outer tube by an adhesive strip spirally wound about the body of the inner tube. An electrical connection is covered with the insulator by disposing it within the inner tube, heat-shrinking the inner tube about the connection, and then sealing the outer tube about the heat-shrunk inner tube under heat and pressure.

5 Claims, 4 Drawing Figures

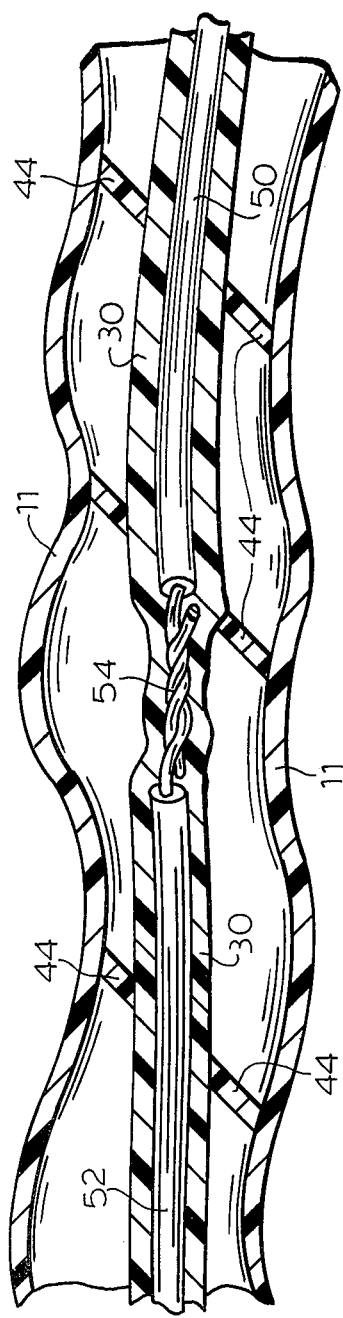
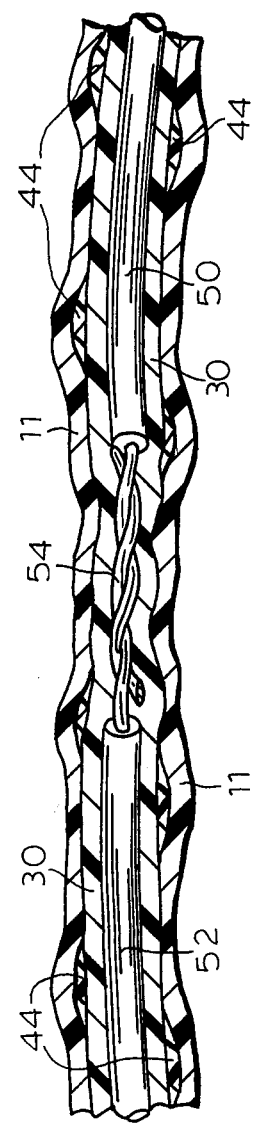
FIG.3
FIG.4

ELECTRICAL CONNECTION INSULATOR AND METHOD OF COVERING AN ELECTRICAL CONNECTION THEREWITH

BACKGROUND OF THE INVENTION

1. Field of the Invention

The invention relates to an improved insulator for covering electrical connections, and more particularly relates to tubular insulators which may be slipped over the ends of wire splices and secured in place to insulate the electrical connection.

2. Brief Description of the Prior Art

The art is replete with descriptions of insulator devices for insulating electrical wire connections. Representative of prior art devices is that described in the U.S. Pat. Nos. 3,742,123; RE. 30,447; and RE. 30,817.

In general, the prior art insulating devices are relatively complex in structure and may comprise, for example, tubular members having diverse, layered compositions. For example, multi-layered tubular devices are known which comprise an outer layer of a heat shrinkable, synthetic polymeric resin lined with a soft, thermoplastic resin for encapsulating electrical wires. In use, these devices are inserted over the electrical connection and exposed to heat sufficient to shrink the outer tubular layer. As the outer tubular layer shrinks, around the electrical connection, the soft thermoplastic liner softens and flows around the electrical connection to effect an encapsulation of the wires.

Those skilled in the art will appreciate that the prior art devices as described above are relatively complex in structure and expensive to manufacture. In addition, the soft thermoplastic liners may be expressed from the shrinking outer layer, during their use. This is undesirable, since the expressed theremoplastic materials may be messy, adhesive in nature and unsightly to the finished product.

The electrical connection insulators of the present invention are characterized in part in that they may be fabricated from polymeric resin materials which are more stable, thermally, i.e., they do not flow under conditions of use, thereby obviating the problem of an expressed adhesive mess. The insulators of the invention are particularly useful for insulating electrical wire connections within motor assemblies. In this use, the insulators are initially secured to the electrical connection by a selective shrinking of one component of the insulator about the connection. The wires and connector may then be handled. Subsequently, the insulator is permanently emplaced under heat and pressure.

SUMMARY OF THE INVENTION

The invention comprises an electrical connection insulator, which comprises;

1. a first tube having
    (a) a first end;
    (b) a second end;
    (c) a tubular body between and joining the first and second ends, having an inner surface and an outer surface; and
    (d) an open passage defined by the body inner surface, providing open communication between the first and second ends, the space of said passage being in direct contact with the inner surface; said tube being formed from a monolayered film of a non-adhesive, heat stable, dielectric, synthetic, polymeric resin; and 2. a second tube having
    (a) a first end;
    (b) a second end;
    (c) a tubular body between and joining the first and second ends, having an inner surface and an outer surface;
    (d) an open passage defined by the body inner surface, providing open communication between the first and second ends;
    said second tube being formed from a monolayered film of a non-adhesive, heat shrinkable, dielectric, synthetic, polymeric resin; said second tube being positioned within the open passage of the first tube; and 3. a connector secured to a selected minor portion of the outer surface of the tubular body (c) of the second tube and to a selected minor portion of the inner surface of the tubular body (c) of the first tube, whereby the second tube is connected to the first tube, the non-selected major portions of the outer surface of the second tube and the non-selected major portions of the inner surface of the first tube being spaced apart and free of connection to each other.

The terms "heat stable" and "heat-shrinkable" as used herein are relative terms and mean that at a given useful operating temperature one film of a first polymeric resin will shrink (heat-shrinkable) while at the same given temperature another film of a second polymeric resin will maintain its dimensional stability (substantially).

BRIEF DESCRIPTION OF THE DRAWINGS

FIG. 3 is a view as seen in FIG. 2, showing an inserted electrical wire connection, and following a selective shrinking of the device.

FIG. 4 is a view of the device shown in FIG. 3, after completion of its use in the protection of the enclosed electric wire connection.

DETAILED DESCRIPTION OF THE PREFERRED EMBODIMENT OF THE INVENTION

Those skilled in the art will gain an appreciation of the invention from a viewing of the accompanying drawings of FIGS. 1-4, inclusive, when read in conjunction with the following description.

Figure 1:
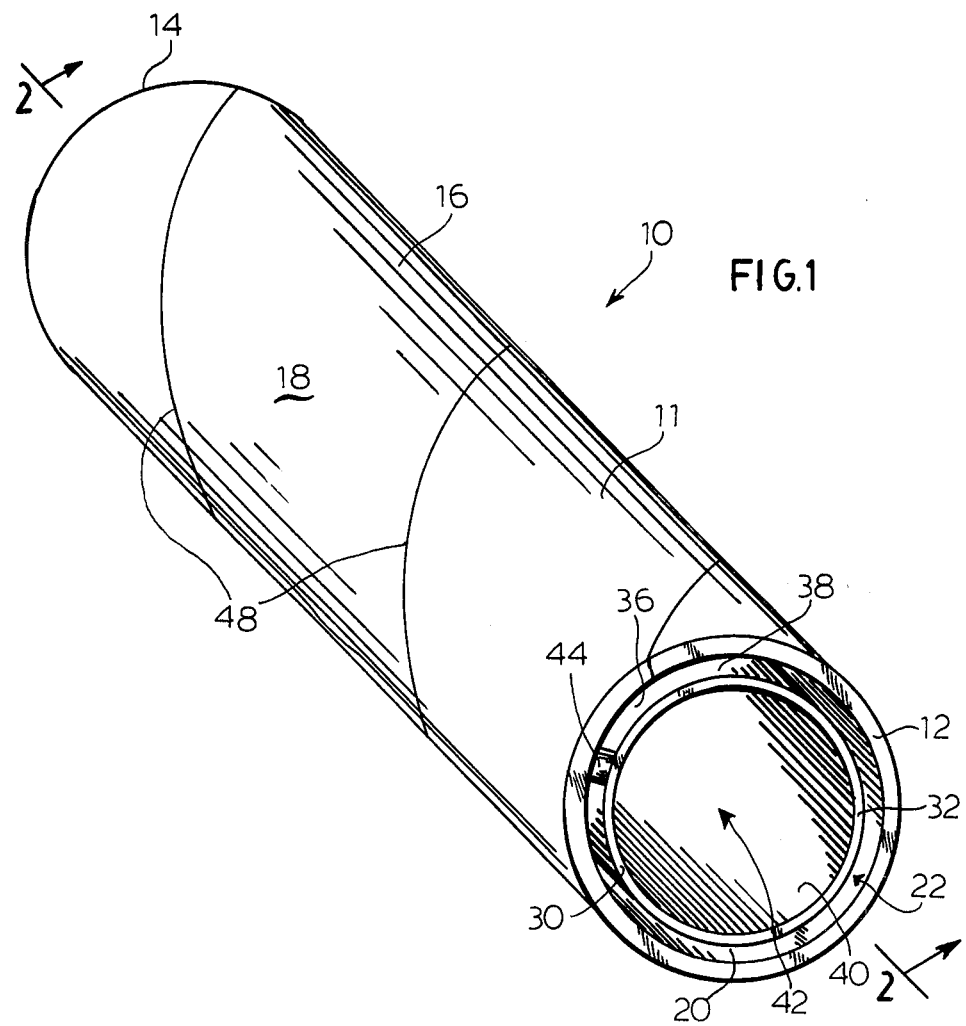
FIG. 1 is a view in perspective of an embodiment device of the invention.

FIG. 1 is an enlarged view in perspective of an embodiment electrical connection insulator of the invention. The insulator 10 is a "tube-within-a-tube". That is, the insulator 10 comprises a first tube 11 having a first end 12 and a second end 14. A tubular body 16 is between and joins ends 12, 14. The body 16 has an outer surface 18 and an inner surface 20. The inner surface 20 defines a passage 22 which provides open communication within body 16, between the ends 12, 14. The passage space 22 is in direct contact and defined by the inner surface 20 of the body 16.

Disposed within the space 22 is a second tube 30 having a first end 32 and a second end (not seen in FIG. 1). A tubular body 36 is between and joins the ends. The body 36 has an outer surface 38 and an inner surface 40. The inner surface 40 defines a lumen or passage 42 which provides open communication within the body 36, between the ends of the second tube 30. The tube 30 is spaced apart from, but connected to the inner surface 20 of the first by connector 44. In the preferred embodiment insulator 10, the connector 44 is a strip of an adhesive spirally wound about the outer surface 38 of second tube 30. The connector is an adhesive which binds to the surface 38 and the inner surface 20 of first tube 11, thereby securing the tubes 11, 30 to each other at selected portions of the respective surfaces 20, 38. The non-selected portions of the surfaces 20, 38, i.e., those portions free of the connector 44, remain spaced apart and free of each other so that they may move in respect to each other. The connector 44 in a spirally wound strip form is preferred but other physical configurations may be used, i.e., for example, interrupted strips, bars, dots, etc., so long as the connected surfaces 20, 38 represent a minor proportion of the total surface area of each of surfaces 20, 38. The major proportions of the surfaces 20, 38 should be free to move in respect to each other as will be described more fully hereinafter.

Figure 2:
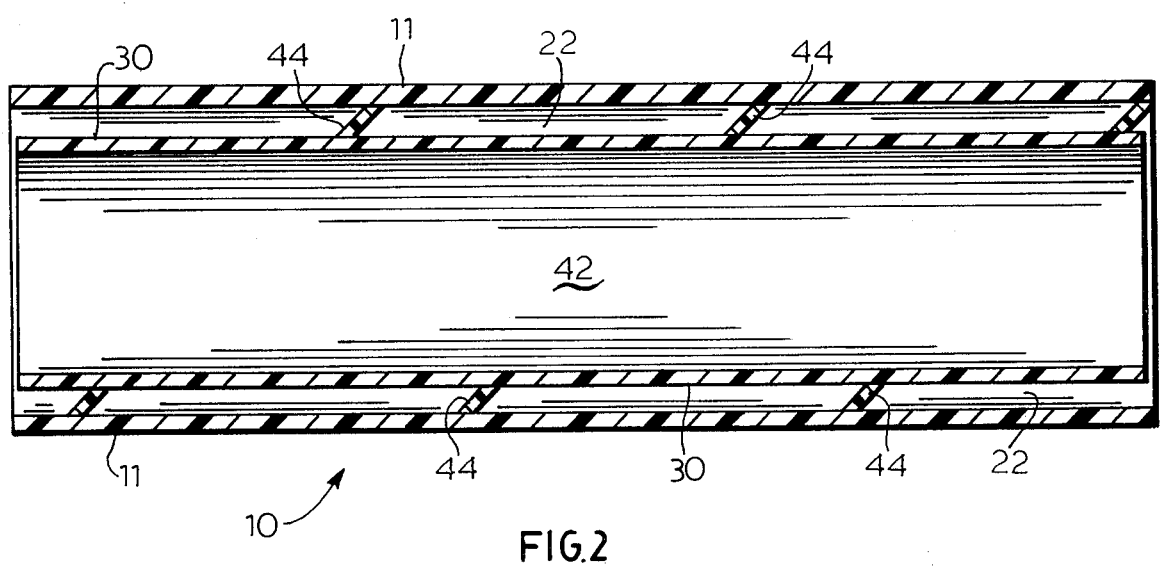
FIG. 2 is a cross-sectional, side elevation of a portion of the device shown in FIG. 1 as taken along the section line 2—2.

Referring to FIG. 2, a cross-sectional side elevation of the central portion of the insulator 10, one can see further the details of the construction of insulator 10.

The tube 11 is formed from a film of a non-adhesive, heat-stable, dielectric, synthetic, polymeric resin. Preferably, the film used to fabricate tube 11 will remain dimensionally stable when exposed to temperatures up to 275° F. to 400° F. Such films are well known and are represented by films of polyesters, polyamides, polyolefins, polyvinyl chloride and the like having sufficient cross-linking to maintain dimensional stability. Preferred, are heat stable polyethylene terephthalate resin films.

The tube 30 may be formed from a mono-layered film of a non-adhesive, heat shrinkable, dielectric, synthetic, polymeric resin. Films of such polymeric resin are well-known in the art as is the method of their fabrication and forming into tubular members. Representative of such polymeric resins are polyolefins, such as polyethylene, polypropylene and the like; polyamides; polyurethanes; polyvinylchlorides; and like resins which have been processed to impart to them so-called "elastic memories"; see for example U.S. Pat. No. 3,297,819. Preferred, are biaxially-oriented, heat shrinkable polyethylene terephthalate films such as are disclosed in U.s. Pat. No. 3,631,899. These heat shrinkable polymeric resin films generally shrink when exposed to temperatures of circa 275° F. to 400° F.

The tubes 11, 30 may be formed by any conventional means of extruding tubular forms from the above-mentioned polymeric resins. Alternatively and preferably, the tubes 11, 30 of the insulator 10 are fabricated by spirally winding strips of the polymeric resin in the form of films. Mostly preferably, the tube 30 is spirally wound, the connector 44 applied to the outer surface 38 and the tube 11 fabricated thereon. The technique of spirally winding tubular forms from films is well-known and need not be described herein; see for example the description in U.S. Pat. No. 3,037,529. When spirally wound from a film, the tubes 11, 30 of the insulator 10 will exhibit a spirally wound joint 48 as shown in the FIG. 1. Such spirally wound tubes 11, 30 may be made from a single film strip or they may be plied with a plurality of strips.

The insulator 10 may be employed by slipping it over an electrical connection as shown in FIG. 3. FIG. 3 is a view as seen in FIG. 2 with an inserted electrical wire 50 and an inserted electrical wire 52. Insertion is into the passage 42 to a point wherein the pigtail connection 54 of bare wires is covered by the composite tube 10. The insulator 10 with inserted connection 54 has then been exposed to a temperature sufficient to selectively shrink the inner tube 30, while the outer tube 11 has remained unshrunk. The connection 54 is securely covered and engaged by the shrunken tube 30. In this position, the insulator 10 is initially placed and the insulator 10 with covered connection 54 may be handled, for example in an electric motor production line. The tubes 11, 30 remain connected together. If during handling the then tubing 30 should be punctured or weakened by contact with the connection 34, the outer tube 11 still provides dielectric covering. In a final production step, the assembled insulator 10 with the enclosed connection 54 is placed under heat and pressure sufficient to completely enclose the connection 54, as may be seen in FIG. 4. The double tube arrangement provides a double layer of dielectric protection.

Those skilled in the art will appreciate that the embodiment insulator 10 described above may be made with one open end and one closed end, and may be made in any sizes desired to insulate any size electrical connection and/or wires.

The following example describes the manner and process of making the invention and sets forth the best mode contemplated by the inventor but is not to be construed as limiting.

EXAMPLE 1

A strip of 0.0015" heat-shrinkable polyethylene terephthalate (Mylar, E. I. DuPont De Nemours) is spirally wrapped on a mandrel to form a tube. A second strip of the same polyethylene teperphthalate film which has been adhesively coated is spirally wrapped over the tube to form a double-layered tube.

A third layer, of a non-heat shrinkable polyethylene terephthalate (Mylar, supra.) coated with a ¼" wide strip of adhesive is then spirally wound onto the double-layered tube. A fourth layer of the same non-heat shrinkable polyethylene terephthalate which has one surface fully coated with adhesive is then spirally wrapped over the third layer to form an electrical insulator tube. The tube is cut into a number of tubes having a length of about 3".

The smaller tubes may be slipped over electrical wire connections and when exposed to a temperature of circa 300° F. the two inner layers shrink to securely cover the connection. The outer layers do not shrink.

Subsequently, the covered connection may be pressed under a temperature of circa 350° F. to finish the covering.

EXAMPLE 2

The procedure of Example 1, supra., is repeated except that the two layers of non-heat shrinkable Mylar as used threin are replaced with Kraft paper to obtain an insulator which may be used as described in Example 1, supra.

What is claimed:
1. An electrical connection insulator, which comprises;
A. a first tube having
(a) a first end;

(b) a second end;
(c) a tubular body between and joining the first and second ends, having an inner surface and an outer surface; and
(d) an open passage defined by the body inner surface, providing open communication between the first and second ends, the space of said passage being in direct contact with the inner surface; said tube being formed from a mono-layered film of a non-adhesive, heat stable, dielectric, synthetic, polymeric resin; and B. a second tube having
(a) a first end;
(b) a second end;
(c) a tubular body between and joining the first and second ends, having an inner surface and an outer surface;
(d) an open passage defined by the body inner surface, providing open communication between the first and second ends; said second tube being formed from a mono-layered film of a non-adhesive, heat shrinkable, dielectric, synthetic, polymeric resin; said second tube being positioned within the open passage of the first tube; and C. a connector secured to a selected minor portion of the outer surface of the tubular body (c) of the second tube and to a selected minor portion of the inner surface of the tubular body (c) of the first tube, whereby the second tube is connected to the first tube, the non-selected major portions of the outer surface of the second tube and the non-selected major portions of the inner surface of the first tube being spaced apart and free of connection to each other.

2. The insulator of claim 1 wherein the first tube is fabricated from polyethylene terephthalate and the second tube is fabricated from a biaxially oriented polyethylene terephthalate.

3. The insulator of claim 1 wherein the first and second tubes are fabricated by a spiral winding of the polymeric resin film.

4. The insulator of claim 1 wherein the connector is an adhesive spirally wound about the body of the second tube.

5. A method of protecting an electrical connection, which comprises;
providing an insulator, which comprises;
A. a first tube having
(a) a first end;
(b) a second end;
(c) a tubular body between and joining the first and second ends, having an inner surace and an outer surface; and
(d) an open passage defined by the body inner surface, providing open communication between the first and second ends, the space of said passage being in direct contact with the inner surface; said tube being formed from a mono-layered film of a non-adhesive, heat stable, dielectric, synthetic, polymeric resin; and B. a second tube having
(a) a first end;
(b) a second end;
(c) a tubular body between and joining the first and second ends, having an inner surface and an outer surface;
(d) an open passage defined by the body inner surface, providing open communication between the first and second ends; said second tube being formed from a mono-layered film of a non-adhesive, heat shrinkable, dielectric, synthetic, polymeric resin; said second tube being positioned within the open passage of the first tube; and C. a connector secured to a selected minor portion of the outer surface of the tubular body (c) of the second tube and to a selected minor portion of the inner surface of the tubular body (c) of the first tube, whereby the second tube is connected to the first tube, the non-selected major portions of the outer surface of the second tube and the non-selected major portions of the inner surface of the first tube being spaced apart and free of connection to each other, inserting the connection into the open passage of the second tube; heat-shrinking the second tube about the connection; and sealing the first tube about the heat-shrunk second tube, under heat and pressure.

* * * * *